(12) United States Patent
Wang et al.

(10) Patent No.: US 10,012,204 B2
(45) Date of Patent: Jul. 3, 2018

(54) ENGINE OPERATION CONTROL

(71) Applicants: Shu Wang, Rochester Hills, MI (US); Robert Gary Prucka, Greenville, SC (US); Hussein Dourra, Bloomfield Hills, MI (US); Michael Prucka, Auburn Hills, MI (US); Qilun Zhu, Greenville, SC (US)

(72) Inventors: Shu Wang, Rochester Hills, MI (US); Robert Gary Prucka, Greenville, SC (US); Hussein Dourra, Bloomfield Hills, MI (US); Michael Prucka, Auburn Hills, MI (US); Qilun Zhu, Greenville, SC (US)

( * ) Notice: Subject to any disclaimer, the term of this patent is extended or adjusted under 35 U.S.C. 154(b) by 0 days.

(21) Appl. No.: 15/189,498

(22) Filed: Jun. 22, 2016

(65) Prior Publication Data

US 2016/0377043 A1 Dec. 29, 2016

Related U.S. Application Data

(60) Provisional application No. 62/183,275, filed on Jun. 23, 2015, provisional application No. 62/321,403, filed on Apr. 12, 2016.

(51) Int. Cl.
*F02P 5/15* (2006.01)
*G05B 15/02* (2006.01)
(Continued)

(52) U.S. Cl.
CPC .............. *F02P 5/15* (2013.01); *F02D 35/024* (2013.01); *F02D 35/028* (2013.01);
(Continued)

(58) Field of Classification Search
CPC ...... F02D 35/023; F02D 35/025; F02D 37/02; F02D 41/1401; F02D 41/402; F02P 5/15; F02P 5/1502; G01M 15/042; G05B 15/02
(Continued)

(56) References Cited

U.S. PATENT DOCUMENTS

2007/0055437 A1* 3/2007 Yamaguchi ......... F02D 41/0025
701/104
2008/0202469 A1* 8/2008 Kang ..................... F02M 26/01
123/435

(Continued)

OTHER PUBLICATIONS

Cavina et al., "Spark Advance Control based on a Grey Box Model of the Combustion Process," SAE Technical Paper Series, Powertrain & Fluid Systems Conference and Exhibition, San Antonio, TX, Oct. 24-27, 2005—12 pages.

(Continued)

*Primary Examiner* — John Kwon
*Assistant Examiner* — Johnny H Hoang
(74) *Attorney, Agent, or Firm* — Dority & Manning, P.A.

(57) ABSTRACT

Systems and methods of controlling operation of a vehicle engine are provided. For instance, one example aspect of the present disclosure is directed to determining a spark timing associated with a combustion engine. For instance, a combustion phasing target to be implemented by a combustion engine can be received. A spark timing associated with the combustion engine can be determined based at least in part on the combustion phasing target. The spark timing can be determined based at least in part on an optimization comprising one or more iterations determined during an engine cycle. The spark timing is determined based at least in part on a combustion phasing prediction model determined based at least in part on at least one of laminar flame speed, residual gas mass, or turbulent intensity.

17 Claims, 14 Drawing Sheets

(51) Int. Cl.
*F02D 41/14* (2006.01)
*F02D 35/02* (2006.01)
*F02D 41/00* (2006.01)

(52) U.S. Cl.
CPC ..... *F02D 41/1401* (2013.01); *F02D 41/1406* (2013.01); *F02D 41/1448* (2013.01); *G05B 15/02* (2013.01); *F02D 41/0062* (2013.01); *F02D 2041/1417* (2013.01); *F02D 2041/1433* (2013.01); *Y02T 10/46* (2013.01)

(58) Field of Classification Search
USPC ........ 701/102, 105, 110; 123/290, 301, 305, 123/308, 435, 406.19, 406.29, 406.45, 123/406.47, 406.48
See application file for complete search history.

(56) References Cited

U.S. PATENT DOCUMENTS

| | | | | |
|---|---|---|---|---|
| 2008/0319633 | A1* | 12/2008 | Moriya | F02D 35/023 701/103 |
| 2009/0125210 | A1* | 5/2009 | Forte | F02D 41/1458 701/103 |
| 2010/0071659 | A1* | 3/2010 | Moriya | F02D 13/0261 123/406.41 |
| 2010/0108033 | A1 | 5/2010 | Hillion et al. | |
| 2012/0118266 | A1* | 5/2012 | Yang | F02P 5/04 123/406.26 |
| 2013/0160739 | A1* | 6/2013 | Suzuki | F02D 43/04 123/406.29 |
| 2014/0311450 | A1* | 10/2014 | Minami | F02P 5/045 123/406.46 |
| 2015/0316019 | A1* | 11/2015 | Kimura | F02P 9/002 123/406.19 |

OTHER PUBLICATIONS

Xiao et al., "Virtual Combustion Phasing Target Correction in the Knock Region for Model-Based Control of Multi-Fuel SI Engines," SAE International Journal of Engines, vol. 6, No. 1, Apr. 8, 2013, pp. 228-236.

Zhu et al., "Model-Based Optimal Combustion Phasing Control Strategy for Spark Ignition Engines," SAE International Journal of Engines, vol. 9, No. 2, Apr. 5, 2016, pp. 1170-1179.

Zhu et al., "Model-Based Control-Oriented Combustion Phasing Feedback for Fast CA50 Estimation," SAE International Journal of Engines, vol. 8, No. 3, Jan. 20, 2015, pp. 997-1004.

PCT International Search Report for corresponding PCT Application No. PCT/US2016/038700, dated Oct. 4, 2016, 4 pages.

* cited by examiner

ENGINE OPERATION CONTROL

CROSS-REFERENCE TO RELATED APPLICATIONS

This application claims filing benefit of previously filed U.S. Provisional Application Ser. No. 62/183,275 having a filing date of Jun. 23, 2015, and previously filed U.S. Provisional Application Ser. No. 62/321,403 having a filing date of Apr. 12, 2016, both of which are incorporated herein by reference in their entirety.

FIELD

The present subject matter relates generally to internal combustion engines and more particularly to controlling the operation of an internal combustion engine.

BACKGROUND

Conventional spark ignition engines may regulate combustion phasing with map-based spark timing control. The calibration of such maps can consume significant amounts of time and resources making it less favorable for spark ignition engines having a high number of control actuators. Spark timing can have a significant influence on fuel efficiency, torque, and emissions. In this manner, accurate calibration of spark timing can be of critical importance to overall system performance. In particular, controlling spark timing to achieve optimal combustion phasing can be beneficial to spark ignition engine performance and efficiency.

Internal residual gases associated with combustion engines are generally composed of exhaust gases that have been recycled from a previous engine cycle. These gases are almost always present in-cylinder due at least in part to mechanical limitations in clearing the entire cylinder volume, pressure driven backflows into the intake, and/or valve overlap strategies. Mass-production sensors for direct measurement of internal residual gas mass (or fraction) are generally not currently available, driving the need for fast and accurate prediction models for the purposes of engine control. Residual gas mass (RGM) prediction is a key enabler for model-based engine control strategies because it is a key input for combustion phasing control, air mass determination, and/or other algorithms.

Semi-empirical residual gas prediction models are a popular consideration for engine control purposes due to their simplified model form and reduced computational efforts. Control-oriented residual gas calculation models have been developed using several different semi-empirical correlations. While some of these models may not have originally been intended for real-time control, their computational complexity is of a level that they have now become feasible for implementation in modern engine controllers. These correlations can utilize either standard engine sensors (e.g. intake manifold pressure, engine speed, etc.) and/or models that are generally available within an engine controller (e.g. exhaust pressure and temperature). Physics-based energy balance residual gas calculation methods have also been developed that can reduce or eliminate calibration constants. These methods may demonstrate high accuracy, but they rely on crank angle resolved calculations that increase on-board processing requirements as compared to semi-empirical approaches.

Conventional semi-empirical approaches may include separating residual gas into two terms: burned gas from backflow into the cylinder during valve overlap and trapped residual gas due to clearance volume. Experimental RGF data can be used to calibrate model constants and the model may be suitable for real-time RGF prediction. This widely used model, however, neglects the influence of dynamic pressure waves in the intake and exhaust. Additionally, the model predicts residual gas fraction, which means that uncertainty in volumetric efficiency can influence the residual mass prediction. Other RGF models have been developed that are based on intake and exhaust manifold pressure ratio, compression ratio, AFR, cylinder intake volumetric efficiency and/or EGR percentage. Such models may not explicitly contain empirical fit constants, but may require a method for volumetric efficiency prediction. Various other models have been developed. However, such models can be inefficient and/or inaccurate.

SUMMARY

Aspects and advantages of the invention will be set forth in part in the following description, or may be obvious from the description, or may be learned through practice of the invention.

One example aspect of the present disclosure is directed to a computer-implemented method of determining a spark timing associated with a combustion engine. The method includes receiving, by one or more computing devices, a combustion phasing target to be implemented by a combustion engine. The method further includes determining, by the one or more computing devices, a spark timing associated with the combustion engine based at least in part on the combustion phasing target. The spark timing is determined based at least in part on an optimization comprising one or more iterations determined during an engine cycle. The spark timing is determined based at least in part on a combustion phasing prediction model determined based at least in part on at least one of laminar flame speed, residual gas mass, or turbulent intensity. Other example aspects of the present disclosure are directed to the use of systems and methods for controlling the operation of an engine.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
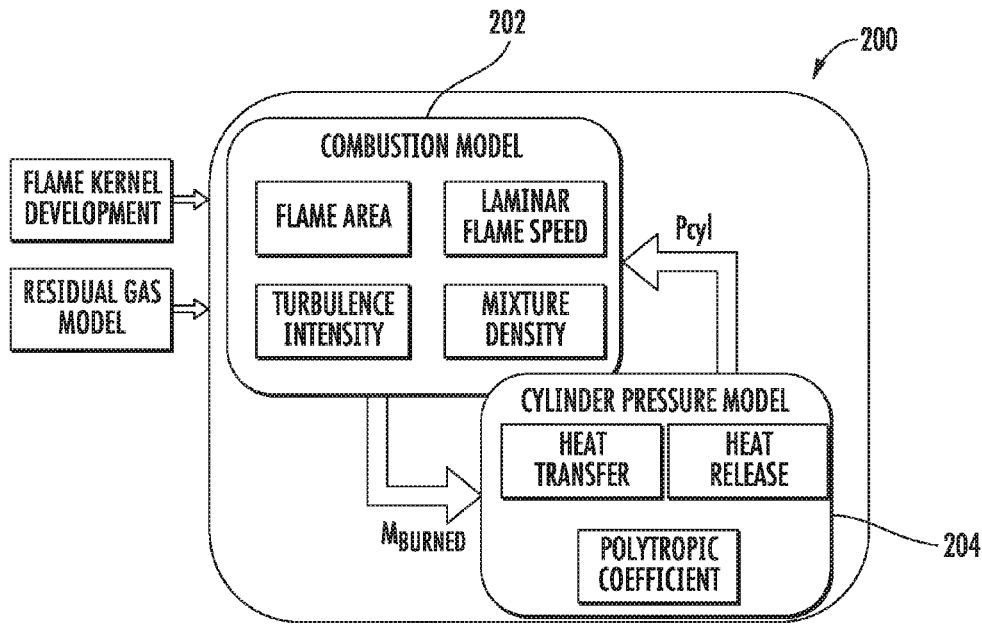
FIG. 1 depicts an example combustion phasing model according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to controlling a spark timing (SPKT) associated with a combustion engine to achieve optimal combustion phasing without violating the constraints of normal combustion. In particular, SPKT can be manipulated to track a designated combustion phasing reference (e.g. CA50). In some implementations, the SPKT can be manipulated or controlled to generate a desired combustion phasing subject to one or more constraints. For instance, the SPKT can be manipulated or controlled to generate the desired combustion phasing without inducing engine knocking and/or excessive coefficient of variation (COV) in indicated mean effective pressure (IMEP) associated with the combustion engine.

In some implementations, the combustion phasing can be modeled by a quasi-dimensional flame entrainment combustion model. For instance, such combustion model can assume that a fresh mixture at the flame front is entrained into small eddies and then burned up in a characteristic amount of time. For instance, the flame entrainment can be represented as follows:

$$\frac{dm_e}{dt} = \rho_{unburned} A_{flame}(u' + S_L)$$

The above equation describes the unburned mass entrainment rate at the flame front. It is assumed that the flame propagates through unburned charge along Kolmogorov scale vortices entraining turbulent eddies. The unburned mass entrainment rate is determined by unburned mixture density, flame front area, laminar flame speed, and turbulence intensity. After the unburned mixture entrainment, mass burn-up occurs at a rate described as follows:

$$\frac{dm_b}{dt} = \frac{m_e - m_b}{\tau} + \rho_{unburned} A_{flame} S_L$$

Burn-up occurs at a characteristic time $\tau$, which is defined as the time to burn up an eddy at laminar flame speed. The eddy size is assumed to be Taylor micro scale ($\lambda$).

FIG. 1 depicts an example combustion phasing model 200 according to example embodiments of the present disclosure. System 200 may be implemented using one or more computing devices. For instance, such computing device may include one or more processor(s) and associated memory device(s) configured to perform a variety of computer-implemented functions and/or instructions (e.g. performing the methods, steps, calculations and the like and storing relevant data as disclosed herein). The instructions when executed by the processor can cause the processor to perform operations, including providing control commands to various aspects of system 200. In some implementations, such computing devices can correspond to controller(s) 104 and/or system control 108 of FIG. 23. As shown, model 200 includes a combustion model 202 and a cylinder pressure model 204. The combustion model 202 generates a burned mass representation, which is provided to the cylinder pressure model 204 as input. The cylinder pressure model determined a cylinder pressure associated with the combustion engine and provides such cylinder pressure back to combustion model 202. Combustion model 202 requires several inputs. In some implementations, one or more of the required inputs can require separate models for representing the inputs. For instance, combustion model 202 requires laminar flame speed, turbulence intensity, cylinder pressure prediction and flam kernel development as inputs.

Laminar flame speed is an important intrinsic property of a combustible fuel, air, and burned gas mixture. It can be defined as the velocity, relative to and normal to the flame front, with which unburned gas moves into the front and is transformed to the products under laminar flow conditions. Laminar flame speed can be measured in spherical closed vessels by propagating a flame radially outward from the vessel center. The laminar burning velocity can be calculated as follows:

$$S_L = \frac{dm_b/dt}{A_{flame}\rho_{unburned}}$$

wherein $A_{flame}$ is flame front area and $\rho_{unburned}$ is unburned gas density. Laminar flame speed can be estimated with unburned mixture thermodynamic properties and composition. For instance, a semi-empirical laminar flame speed power law model can be represented as follows:

$$S_L = S_{L,0}\left(\frac{T_{unburned}}{T_0}\right)^\alpha \left(\frac{P_{cyl}}{P_0}\right)^\beta$$

where $\alpha=2.4-0.271\emptyset^{3.51}$, $\beta=0.357+0.14\emptyset^{2.77}$. In the above model, the reference laminar flame speed $S_{L,0}$, is defined by $S_{L,0}=B_m+B_\emptyset(\emptyset-\emptyset_m)^2$, and is related to fuel properties and air-to-fuel ratio. Residual gas effects can be accounted for as follows:

$$S_L = S_{L,0}(1-2.06RGF^{0.77})$$

Residual gas fraction (RGF) is a critical input to the laminar flame speed calculation. RGF can be calculated from engine air mass flow and residual gas mass (RGM). While most conventional internal combustion engine control systems have accurate cylinder charge estimation for fuel injection control, RGM estimation is not commonly available. As will be described in more detail below, one or more RGM models can be used to determine RGF. In some implementations, the RGM model can separate RGM into two parts: trapped residual at exhaust valve closing (EVC) due to unswept cylinder volume, and exhaust gas backflow into the cylinder and intake running during the valve overlap period. In this manner, the RGM model can be represented as follows:

$$RGM = C_1 \cdot \sqrt{((P_e/RT_e) \cdot ((P_e+\Delta Pe_{OL})-(P_i+\Delta Pi_{OL}))} \cdot A_{flow} \cdot \frac{OLV}{N} + C_2 \cdot \left(\frac{P_e}{RT_e}\right) \cdot V_c$$

where $C_1$ and $C_2$ are experimental calibrated constants, $P_e$ and $P_i$ are average exhaust and intake pressure, $\Delta Pe_{OL}$ and $\Delta Pi_{OL}$ are exhaust and intake pressure difference caused by wave tuning dynamic, $A_{flow}$ is valve flow area, OLV is valve overlap volume, N is engine speed, and $T_e$ is exhaust temperature.

Unburned gas temperature is another critical input for laminar flame speed. In some implementations, unburned mixture temperature can be calculated based on the ideal gas law as follows:

$$T_{unburned} = \frac{p \cdot V_{unburned}}{m_{unburned} \cdot R_{unburned}}$$

where $R_{unburned}=287$ J/(kg·K) is the specific gas constant of unburned gas mixture.

Cylinder pressure is a critical input for combustion phasing prediction because it is used to calculate laminar flame speed and cylinder temperature. For instance, cylinder pressure model 204 can be used to determine or estimate a cylinder pressure associated with the combustion engine. In some implementations, one or more cylinder pressure sensors can be used to determine cylinder pressure. Cylinder pressure can be estimated using the First Law of Thermodynamic for an open system, conservation of mass, and the ideal gas law. Such cylinder pressure estimation techniques can require a crank angle resolved calculation. The resulting prediction accuracy can be at least partially determined by calibration using experimental data.

An initial cylinder pressure at intake valve closing (IVC) can be used to initiate cylinder pressure calculation. Cylinder pressure at IVC can be affected by engine speed, manifold pressure (MAP) and intake valve timing. According to example aspects of the present disclosure an empirical expression for cylinder pressure at IVC can utilized to allow for simplicity and/or reduced real-time computational requirements. Cylinder pressure at IVC can vary based on engine speed. In addition, cylinder pressure at IVC has a generally linear relationship with intake valve timing. In some implementations, the cylinder pressure at IVC can be modeled as:

$$P_{IVC}=(ICL-100) \cdot (Slope_{MAP}+Slope_{RPM})+\text{Basic } P_{IVC}\text{-Curve}+P_{IVC,MAP}.$$

The first term in the above equation represents the intake valve timing effect (with engine speeds and load corrections). The second term stores the basic cylinder pressure at IVC curve to capture engine speed effects. The last term corrects for MAP changes. Once the cylinder pressure at IVC has been calculated, the compression stroke cylinder pressure values can be calculated based on the assumption of polytropic compression as:

$$P_{cyl} = P_{IVC}\left(\frac{V_{IVC}}{V_{cyl}}\right)^{n_{comp}}.$$

In the above equation, $V_{cyl}$ is calculated according to the crank angle location and the compression polytropic coefficient, $n_{comp}$, which is assumed to be constant.

Cylinder pressure increases quickly during combustion due to heat release. Cylinder pressure during this phase is computed using the First Law of Thermodynamics and the ideal gas law as follows:

$$\dot{P}_{cyl} = -\frac{n_{comb}P_{cyl}}{V_{cyl}}\dot{V}_{cyl} + \frac{n_{comb}-1}{V_{cyl}}\dot{Q}$$

where $P_{cyl}$ is cylinder pressure, $V_{cyl}$ is instantaneous cylinder volume, $n_{comb}$ is polytrophic coefficient during combustion, and Q is the combination of heat released from the burned mixture and heat transfer losses. Heat transfer losses can be calculated based on the Woschni heat transfer model. The heat release rate from the burned mixture can be calculated using inputs from the combustion routine.

Figure 2:
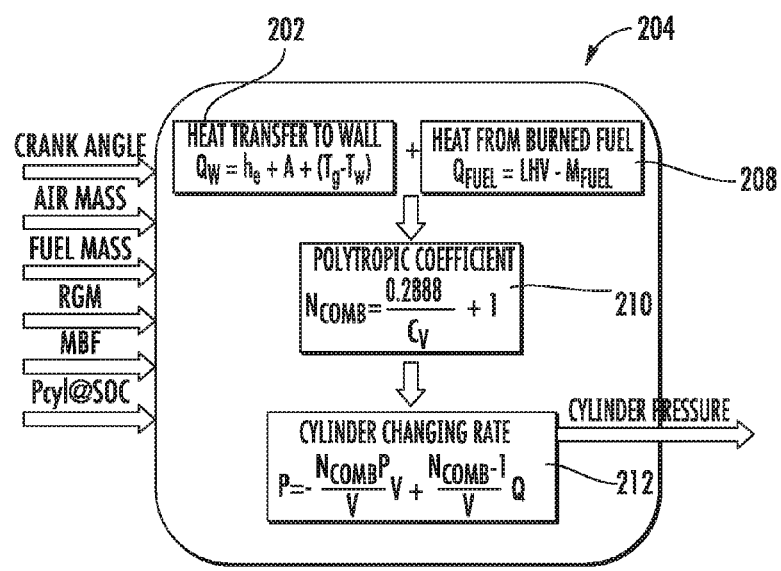
FIG. 2 depicts an example cylinder pressure model according to example embodiments of the present disclosure.

FIG. 2 depicts a more detailed view of example cylinder pressure calculation model 204. In particular, cylinder pressure model 204 includes a heat transfer model 206, a heat release model 208, a polytropic coefficient model 210, and a cylinder pressure model 212. The cylinder pressure calculation can be initialized with a pre-combustion cylinder pressure model.

As indicated, in-cylinder turbulence can also be used to determine combustion phasing in accordance with example embodiments of the present disclosure. In-cylinder turbulence intensity u' can be defined as the root-mean-square value of flow velocity fluctuation. Different methods can be used to model in-cylinder turbulence intensity. Complex multi-dimensional Full Field Modeling (FFM) methods, such as Reynolds stress models (RSM), are comprised of several partial differential equations for stress components and dissipation rates. Large Eddy Simulation (LES) approaches are also applied to calculate in cylinder turbulence intensity (e.g. KIVA engine code). These multi-dimensional models provide accurate turbulence intensity prediction results, but their heavy computational effort makes them unsuitable for feed-forward engine control applications. Turbulent energy dissipation models simplify the turbulence intensity calculation complexity by neglecting in-cylinder swirl and tumble. However, they require crank angle resolved physical values to model kinetic energy, turbulence dissipation rate, and other parameters.

According to example aspects of the present disclosure, a two-step turbulence intensity model can be used. For the first step, turbulence intensity at the start of combustion (CA00) is modeled based on its linear relationship with engine speed (e.g. $u'_{CA00} = C_3 \cdot MPS \cdot M_{u'}$). The constant $C_3$ generally ranges from about 0.5 to about 1.5. As used herein, the term "about," when used in conjunction with a numeral reference, is intended to refer to within 40% of the numeral reference. After start of combustion, crank angle resolved turbulence intensity values are utilized. Based on the rapid distortion theory, turbulence intensity can be calculated from the initial value at CA00 and unburned mixture density as follows:

$$u' = u'_{CA00}\left(\frac{\rho_{unburned}}{\rho_{CA00}}\right)^{\frac{1}{3}}$$

As indicated, flame kernel development can also be used to determine combustion phasing according to example embodiments of the present disclosure. For instance, an Artificial Neural Network (ANN) based flame kernel development model can be utilized. The inputs to such ANN model can include engine speed, MAP, RGF, $P_{cyl}$ and $T_{cyl}$ at spark, spark timing, and/or other suitable inputs.

As indicated, the SPKT determined according to example aspects of the present disclosure can be determined subject to one or more constraints, such as engine knocking and/or excessive COV in IMEP. Knock in a spark ignition engine occurs as the unburned end gases auto-ignite before the spark ignited flame reaches them. This occurs from the expanded burned gas compresses the unburned end gas to cause auto-ignition. Knock may occur when cylinder pressures and temperatures are high (e.g. when combustion phasing is advanced). The engine knocking constraint can be modeled in various suitable manners. For instance, such models may include comprehensive chemical kinetic based simulations, global single step Arrhenius functions describing hydrocarbon oxidation reactions, reduced chemical kinetics descriptions, and/or other suitable models. In some implementations, the engine knocking constraint model can relate the rate of reaction of an auto-ignition process as a function of pressure and temperature, assuming a single-step chemical kinetics, as follows:

$$\frac{d[x]}{dt} = A'_G [x] P^n_{cyl} \exp\left(-\frac{B_G}{T_{cyl}}\right).$$

The ignition delay, in milliseconds, can be expressed as the inverse of the reaction rate of the global single-step mechanism:

$$\tau_G = A_G P^{-n}_{cyl} \exp\left(\frac{B_G}{T_{cyl}}\right)$$

The above equation is developed to represent the ignition delay in a Rapid Compression Machine (RCM) with coefficients extracted from experimental data. In a RCM, the pressure is assumed approximately constant until combustion occurs. However, for a spark-ignited engine, the end gas is compressed by the propagating flame and the temperature rises following a polytropic process. The end gas auto-ignition chemistry may be cumulative and can be predicted by integrating the reaction rate of the end gas at discretized pressure and temperature time steps until the critical time when the integral value is equal to one (L-W knock integral).

Cycle-by-cycle variation of IMEP is caused by the instability of turbulent combustion, the effect of which can be captured by $u'/S_L$ (turbulence intensity/laminar flame speed) and $L/\delta_L$ (turbulent integral length scale/laminar flame thickness). These variables are available from the combustion phasing model based on flame entrainment theory. The effect of combustion stability is maximized when the piston is at Top Dead Center (TDC) position and the cylinder volume is a minimum. SPKT and CA50 are also included as COV of IMEP prediction model inputs to better capture the synchronization between piston motion and the combustion process. In some implementations, the COV of IMEP model can be implemented using an artificial neural network. For instance, a polynomial conversion layer can be added before the artificial neural network to reduce network size and improve extrapolation robustness.

According to example aspects of the present disclosure, an SPKT optimization can be determined based at least in part on a desired combustion phasing reference. In some implementations, such optimization can be a solved in real-time within a single engine cycle. The other engine actuators and states can be assumed to be constant during this period of time (e.g. RPM, MAP and cam timing). For instance, such optimization problem can be a nonlinear programming (NLP) problem expressed as follows:

$$\min_{SPKT}(f(SPKT) - CA50_{target})^2$$

subject to $g(SPKT) \leq KI_{max}$ $h(SPKT) \leq COV_{max}$ where $KI_{max}$ is the specified upper bound of L-W knock integral, $COV_{max}$ is the specified upper bound of COV of IMEP, f (SPKT) is the CA50 model, g(SPKT) is the L-W knock integral, and h(SPKT) is the $COV_{IMEP}$ model.

Advancing SPKT can advance CA50 and increase the knock integral. In this manner, the objective function and the first constraint can be convex if the combustion and knock models are reasonably accurate. Although the relationship between COV of IMEP and SPKT is not monotonic, it is observed that h(SPKT) takes a quadratic like shape for the admissible SPKT range. Thus, the second constraint can be considered as convex.

In this manner, a unique solution to the objective function can be determined. In some implementations, it may be advantageous to reduce or minimize a number of iterations associated with the objective function. For instance, the physics-based combustion model described above can be computationally intensive for online applications, which may cause inefficiencies if a number of iterations are performed.

In some implementations, a 2-phase direct search technique can be used to solve the SPKT optimization. Such direct search technique can rely on the evaluation of functions to find a feasible descending direction (e.g. for minimization problems) of the manipulated variables. Various suitable direct search algorithms can be implemented to solve the optimization problem.

A feasible initial guess of the SPKT can enable interior point method that keep the search point confined in the region and guarantees decreasing objective function values. In this manner, the number of iterations can be significantly reduced. In addition, the solution in such techniques may be feasible and/or better than the starting point even if the optimization is terminated prematurely due to lack of available computation time. The feasible initial estimation can be generated with calibration and stored as a map in a memory associated with the combustion engine. The feasible initial estimation can also be generated using a phase 1 optimization program or other suitable optimization program. The added phase of optimization may evaluate the constraint functions (e.g. knock and/or COV of IMEP).

After the feasible estimation is determined, the second phase of the optimization can begin. The search step size can be computed iteratively after every objective and constraint function is evaluated. In some implementations, the adjustment of SPKT of each iteration can be approximated with the difference of CA50 (e.g. a one-to-one SPKT to CA50 relationship is assumed). In this manner, the search step sizes can have an overall decreasing tendency as the searching point converges to the optimal solution. In some implementations, the optimization process can be terminated once the step size is smaller than a certain threshold. In some implementations, the objective and constraint functions may not be continuous.

In alternative implementations, the optimization can be solved using a constraint relaxation technique. Such constraint relaxation technique can modify the original objective function to approximate the effects of constraints. Thus, such algorithm may not have to handle the constraints explicitly. Such objective function associated with the constraint relaxation technique can be convex, resulting in a unique optimal solution.

In alternative implementations, a gradient-based optimization can be used. For instance, an RLS polynomial fitting technique can be used. In this manner, the objective and constraint functions of the present disclosure can be approximated with low order polynomial functions whose solutions can be easily calculated. Such optimization can be considered as a simple process that compares the SPKT solution for the target CA50, COV limit and knock limit.

Figure 3:
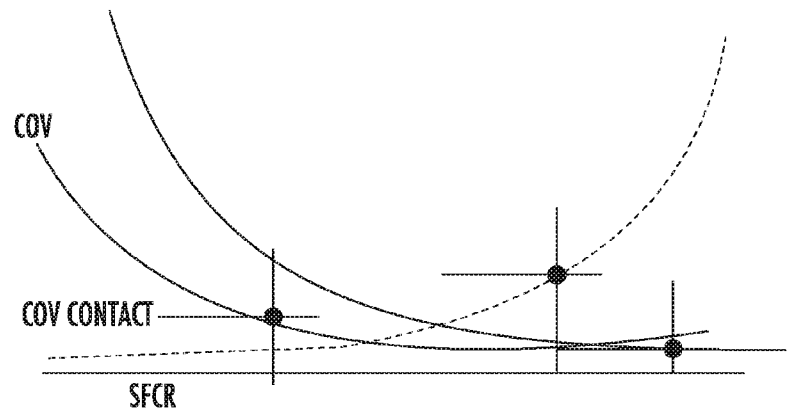
FIG. 3 depicts a plot of an example spark timing optimization process according to example embodiments of the present disclosure.

FIG. 3 depicts a plot of an example SPKT optimization process according to example embodiments of the present disclosure. The effects of SPKT on CA50, COV of IMEP and knock integral vary with engine operating conditions. In addition, the linear and quadratic approximation of some curves are only valid for a narrow range of SPKT. Therefore, the low order polynomial approximation can be adapted for each iteration during the optimization A recursive least squares (RLS) technique can be used to fit such polynomial functions by updating the estimation results iteratively during the optimization process. For instance, as the NLP converges to the optimal solution, the low order polynomial approximation of f, g and h are updated with the RLS method.

Figure 4:
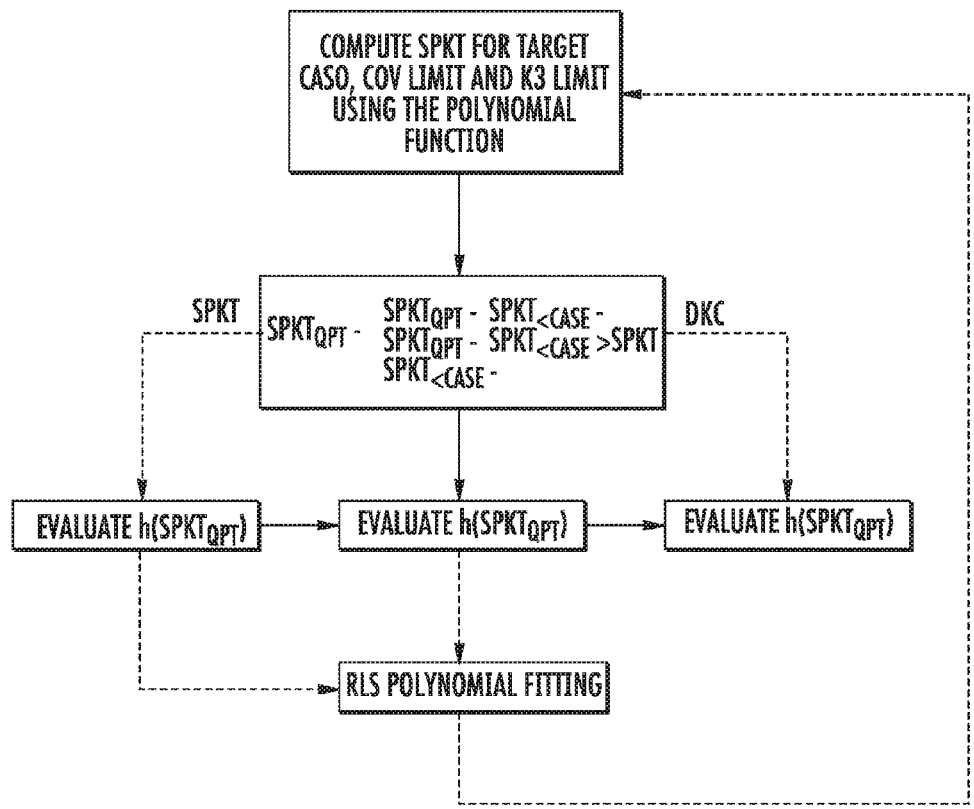
FIG. 4 depicts a flow diagram of an example polynomial fitting process according to example embodiments of the present disclosure.

FIG. 4 depicts a flow diagram of an example RLS polynomial fitting according to example embodiments of the present disclosure. The value of $SPKT_{OPT}$ converges to the actual optimal value as the polynomial approximation improves with more iterations. The original nonlinear functions f, g and h may not be perfectly fitted with a low order polynomial. However, this assumption becomes more reasonable as the optimization converges to a small region around the optimal solution. The objective and constraint functions have minimal curvature in this region, and can be approximated with linear or quadratic functions. Furthermore, this SPKT optimization approach preserves the dependence of the COV and knock constraints on the combustion model. Therefore, each iteration only requires a single execution of the combustion model. The algorithm can be terminated when the variation of $SPKT_{OPT}$ or the coefficient estimation covariance P is smaller than a certain threshold which can be determined by the available computation power of the ECU.

The polynomial functions that approximate the original f, g and h are parameterized as $Y=X^T\theta$ where $Y \in \mathbb{R}^{1 \times 1}$ is the output CA50, COV of IMEP or knock integral, $X \in \mathbb{R}^{m \times 1}$ is the input vector $[SPKT^0, SPKT^1, SPKT^2 \ldots SPKT^m]$, and $\theta \in \mathbb{R}^{m \times 1}$ is the coefficient vector to be estimated. The positive definite covariance matrix can be defined as $P_k = \Sigma_{i=1}^k X(i)X^T(i)$, where k is the current number of iterations. $P_k$ can then be updated for each iteration as $P_k^{-1} = P_{k-1}^{-1} + X(k)X^T(k)$. The estimation of parameter vector $\theta$ can be recursively updated with new output Y(k) and input data X(k) after evaluating $f(SPKT_{OPT})$, $g(SPKT_{OPT})$ and $h(SPKT_{OPT})$ during each iteration. A reasonable initial guess of 0 will reduce the number of iterations over which the RLS algorithm and the entire optimization program converges. Therefore, initial guess $\theta(0)$ can be calibrated and tabulated under various engine operation conditions to reduce online computational burden. This will also result in a smaller $P_0$, which represents a higher confidence level of the initial guess.

The order of the polynomial functions can be freely chosen. Linear or quadratic functions are recommended for the simplicity. It is also possible to parameterize other forms of nonlinear functions to fit the original f(SPKT), g(SPKT), and h(SPKT). In some implementations, linear fitting can be applied. In some implementations, a forgetting factor technique can be used since the original f(SPKT), g(SPKT), and h(SPKT) are nonlinear.

In some implementations, the control oriented combustion phasing model can be applied to an Extended Kalman Filter (EKF), which can compute the estimation gain L of the following equation:

$$CA50_{est} = CA50_{model} + L(CA50_{measure} - CA50_{model}).$$

Other combustion phasing indicators such as CA10 and CA90 can be estimated in the same fashion. The estimation gain can be computed iteratively.

Figure 5:
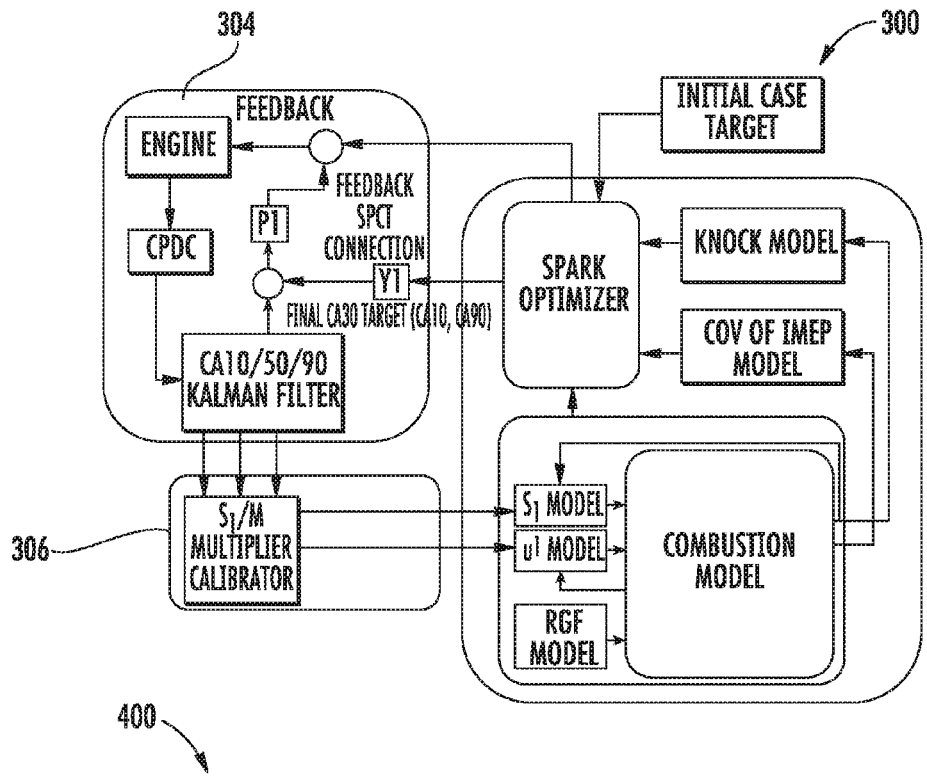
FIG. 5 depicts an example system for controlling spark timing of a combustion engine according to example embodiments of the present disclosure.

FIG. 5 depicts a system 300 for controlling SPKT of a combustion engine according to example embodiments of the present disclosure. System 300 may be implemented using one or more computing devices. For instance, such computing device may include one or more processor(s) and associated memory device(s) configured to perform a variety of computer-implemented functions and/or instructions (e.g. performing the methods, steps, calculations and the like and storing relevant data as disclosed herein). The instructions when executed by the processor can cause the processor to perform operations, including providing control commands to various aspects of system 300. In some implementations, such computing devices can correspond to controller(s) 104 and/or system control 108 of FIG. 23. System 300 includes a feed forward SPKT determination 302, feedback correction 304, and u'/$S_L$ adaptation 306. The initial CA50 target can be provided by an upper level engine controller. The upper level controller is often the engine torque management system that coordinates air-path dynamics and combustion phasing. It usually has a slow update frequency, making it difficult to be integrated with accurate knock and combustion variability constraints. If the given combustion phasing (CA50) target violates the knock or combustion variability constraints the sub-level combustion phasing controller needs find a feasible target that is close to the original target (and corresponding SPKT). This modified target (delayed by one engine cycle) is sent to a Proportional Integral (PI) controller as a tracking reference.

The measured combustion phasing (from the cylinder pressure sensors and the CPDC) is conditioned with an EKF based estimator to suppress the noise power. The estimated combustion phasing measurement is sent to the PI controller and model adaptation algorithm. The combustion model is adapted to correct long term errors by modifying $S_L$ and u' models to match the observed and predicted combustion phasing.

Figure 6:
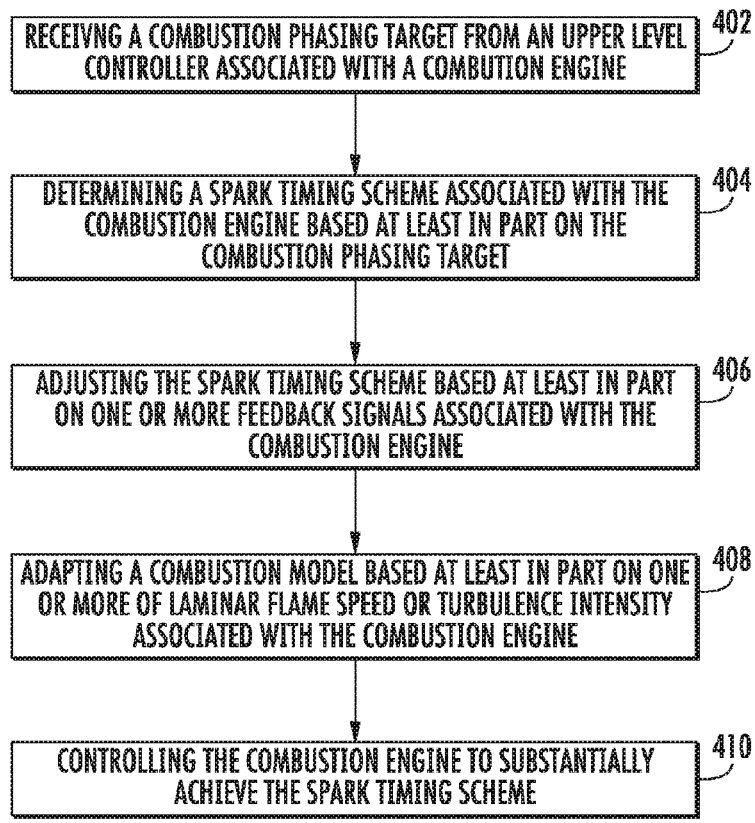
FIG. 6 depicts a flow diagram of an example method of controlling spark timing of a combustion engine according to example embodiments of the present disclosure.

FIG. 6 depicts a flow diagram of an example method (400) of determining a spark timing associated with a combustion engine according to example embodiments of the present disclosure. Method (400) can be implemented by one or more computing devices, such as one or more of the computing devices depicted in FIG. 23. FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (402), method (400) can include receiving a combustion phasing target from an upper level controller associated with a combustion engine. For instance, the upper level controller can be an engine torque management system that coordinates air-path dynamics and combustion phasing. The combustion phasing target can be a CA50 target or other target.

At (404), method (400) can include determining a spark timing scheme associated with the combustion engine based at least in part on the combustion phasing target. The spark timing scheme can be determined to substantially achieve the combustion phasing target, subject to one or more constraints (e.g. engine knock and/or excessive COV of IMEP). The spark timing can be determined by solving an optimization problem (e.g. nonlinear programming problem). The optimization problem can be solved in real-time during one or more engine cycles.

The spark timing can be determined based at least in part on a combustion estimation determined by a combustion phasing model. The combustion phasing model can provide a prediction or estimation of combustion phasing of the engine, and can be determined based at least in part on flame area, laminar flame speed, turbulence intensity, residual gas fraction, mixture density, flame kernel development, cylinder pressure, and/or other parameters.

At (406), method (400) can include adjusting the spark timing scheme based at least in part on one or more feedback signals associated with the combustion engine. For instance, control oriented combustion models are expected to be inaccurate for some engine operating conditions, considering limitations of computational complexity and calibration effort for real-time implementation. These inaccuracies can be corrected with feedback control and model adaptation, both of which require accurate measurement (or estimation) of combustion phasing. Cylinder pressure sensors can be utilized to compute combustion phasing.

At (408), method (400) can include adapting the combustion model based at least in part on one or more of laminar flame speed and turbulence intensity. In particular, the combustion model can be adapted to correct long term errors by modifying $S_L$ and u' models to match the observed and predicted combustion phasing.

As indicated above, combustion phasing can be determined based at least in part on residual gas fraction associated with the combustion engine. Residual gas fraction can be determined based at least in part on residual gas mass (RGM) associated with the combustion engine. RGM can be predicted, for instance, using a semi-physics-based control oriented RGM prediction model. The RGM model is based on Bernoulli's principle and considers engine operating conditions, valve timing and geometry, and piston motion. Moreover, the model captures gas wave dynamic effects in the intake and exhaust manifold pressures.

As used herein, residual gas mass (RGM) can be defined as the in-cylinder burned gas mixture from a previous automobile engine cycle. RGM can consist of two parts; (1) exhaust gas backflow into the cylinder and intake runner during the valve overlap period, and (2) trapped residual gas at an exhaust valve closing due to un-swept cylinder volume. Relative RGM contributions of these two components can depend on engine operating conditions (e.g. valve overlap, overlap centerline, engine speed, intake to exhaust pressure ratio, etc.). A base equation to define RGM can be represented as follows:

$$m_r = m_{backflow} + m_{trapped}$$

The residual gas mass from backflow, $m_{backflow}$, can be determined primarily by the intake and exhaust manifold pressures during overlap, intake and exhaust valve timings, valve profiles, and engine speed. Trapped residual mass, $m_{trapped}$, can be determined by the engine geometry (e.g. engine displacement and compression ratio) and/or burned gas density.

During the valve overlap period (if existent), both intake and exhaust valves are open concurrently. The intake manifold, exhaust manifold, and cylinder may become a system where the gas mixture can freely flow across the valves due to pressure differentials. According to Bernoulli's principle the mass flow rate through an orifice for incompressible flow can be represented as follows:

$$\dot{m} = C \cdot A \cdot \sqrt{2\rho(P_1 - P_2)}$$

Figure 7:
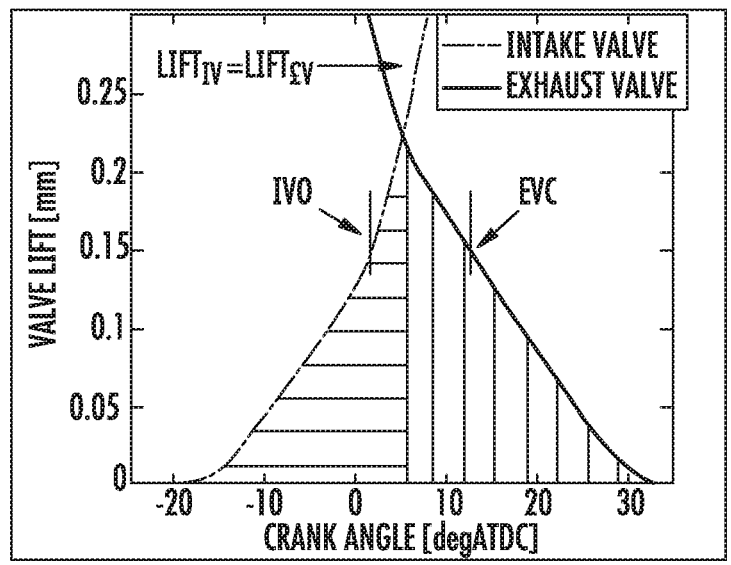
FIG. 7 depicts a plot of example intake and exhaust valve profiles during overlap according to example embodiments of the present disclosure.

In the above equation, C is the valve flow coefficient, A is the effective area which can be calculated from valve lift and timing, and p is the mixture density. $P_1$ and $P_2$ are pressures on each side of the valve with $P_1$ representing the higher pressure. The larger the pressure difference between $P_1$ and $P_2$, the higher of the mass flow rate across the valve. The intake and exhaust manifold pressure difference can be a major factor defining residual gas backflow. The effective flow area A is critical for residual gas mass prediction. It can be separated into intake valve and exhaust valve terms. For the intake portion, the area can be defined by the integral of the band area between the intake valve head and the valve seat from valve opening (IVO) to overlap centerline (OLC). As used herein, overlap centerline can be defined as the crank angle location where the intake and exhaust valves have the same lift. For instance, FIG. 7 depicts a plot of example intake and exhaust valve profiles during overlap. The OLC is the crank angle location where the intake valve plot and the exhaust valve plot meet.

Similarly, the exhaust portion can be the flow area integral from OLC to exhaust valve closing (EVC). These two areas together can make up the effective flow area A. The calculation model is shown as follows, where Di/De is the intake/exhaust valve diameter and Li/Le represents the intake/exhaust valve lift:

$$A = \int_{IVO}^{IV=EV} D_i \cdot L_i d\theta + \int_{IV=EV}^{EVC} D_e \cdot L_e d\theta$$

Figure 8:
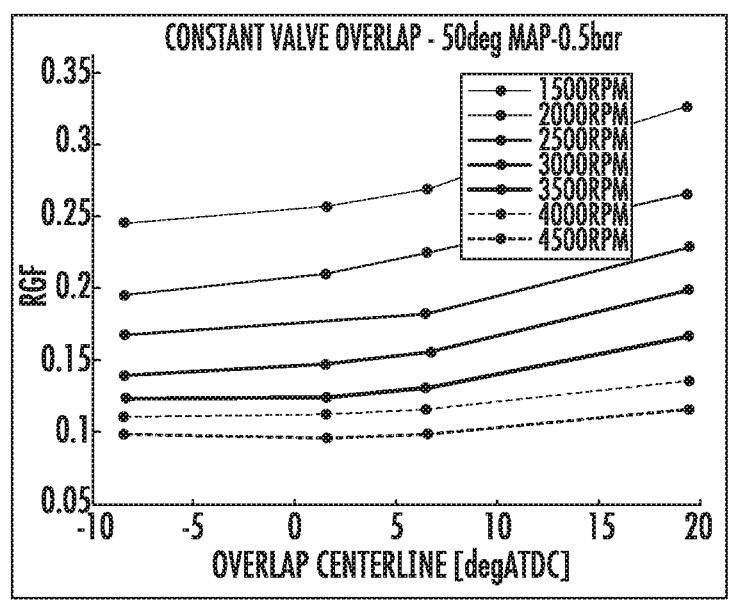
FIG. 8 depicts a plot of example valve OLC effects on residual gas fraction for different engine speeds according to example embodiments of the present disclosure.

Location of the valve overlap centerline can be another important factor that determines residual gas backflow rate. For the same effective flow area value, varying OLC influences residual gas mass value because of the influence of piston motion on valve flows. For instance, FIG. 8 depicts a plot of example valve OLC effects on residual gas fraction for different engine speeds. As the overlap period is shifted further into the intake stroke the change in cylinder volume increases over a given overlap duration resulting in an increase in residual gas mass.

To capture OLC and piston motion effects, the overlap volume (OLV) can be introduced. OLV can be defined as the cylinder volume difference between intake valve opening and exhaust valve closing during a positive valve overlap period. Overlap volume may be used in the residual mass estimation routine to account for the influence of piston motion on gas exchange during the valve overlap period. OLV can be represented as follows:

$$OLV = V_{EVC} - V_{IVO}$$

The influences of piston motion during overlap and engine speed on residual gas backflow can be represented as follows:

$$m_{backflow} = C1 \cdot \sqrt{\rho \cdot (P_e - P_i)} \cdot A_{flow} \cdot \frac{OLV}{N}$$

This equation accounts for all of the primary factors that influence backflow during overlap: flow area, piston motion (through OLV), engine speed (accounting for time), density, and pressure difference across the cylinder. OLV appears in the numerator because higher values lead to an increase in backflow mass. Engine speed, N, is inversely proportional to residual gas backflow mass because it influences the time duration of overlap. The process for fitting the constant C1 is described later.

Figure 9:
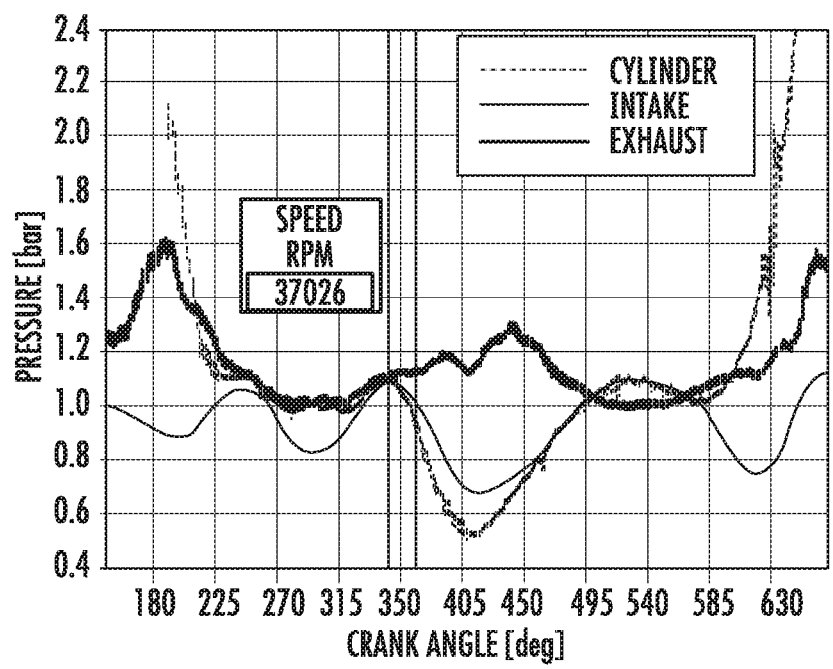
FIG. 9 depicts a plot of example intake pressure, exhaust pressure, and cylinder pressure waves during an engine cycle according to example embodiments of the present disclosure.
Figure 10:
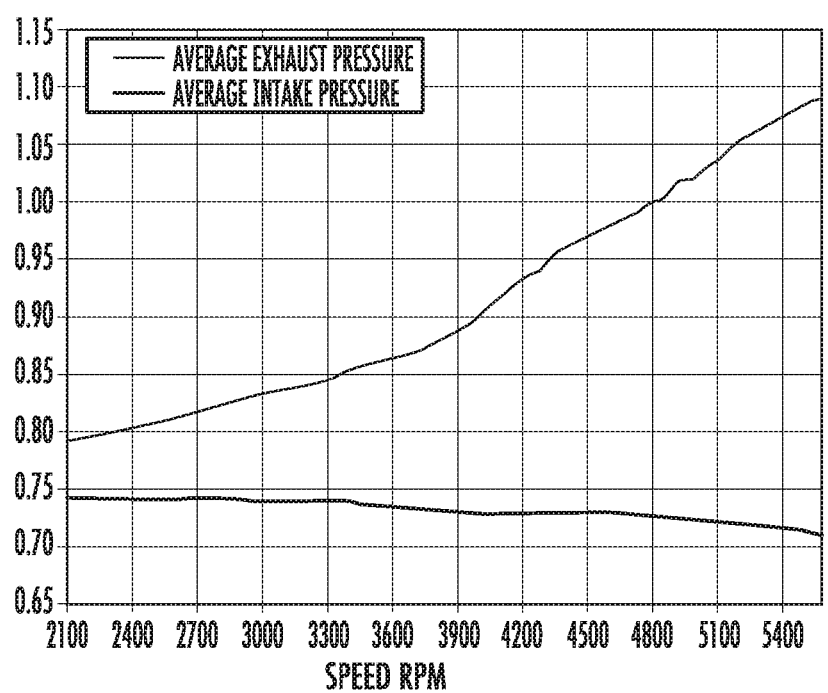
FIG. 10 depicts a plot of example average intake pressure and average exhaust manifold pressure of an engine cycle according to example embodiments of the present disclosure.

FIG. 9 depicts a plot of example intake pressure, exhaust pressure, and cylinder pressure waves during an engine cycle. In FIG. 9, the average intake and exhaust manifold pressures are 0.98 bar and 1.1 bar respectively, but it can be observed how dramatically the pressure changes throughout the cycle. During the valve overlap period (e.g. in the shadowed window) the intake and exhaust pressure values can vary significantly from the average value. FIG. 10 depicts a plot of example average intake pressure and average exhaust manifold pressure of an engine cycle. In particular, FIG. 10 depicts these pressures for a wide-open throttle RPM sweep (fixed camshaft phasing). FIG. 10 further depicts the cycle-averaged (720 degree duration) intake and exhaust manifold pressures for a full-load engine speed sweep with constant intake and exhaust valve phasing. The trends observed in this figure are expected due to increasing total system mass flow rates through fixed geometry intake and exhaust systems. Intake pressure decreases as engine speed increases at full load due to higher pressure losses across the air filter and through the intake system generated by higher air flow rates. Exhaust pressure increases as engine speed increases due to higher mass flow rates through a fixed exhaust geometry.

Figure 11:
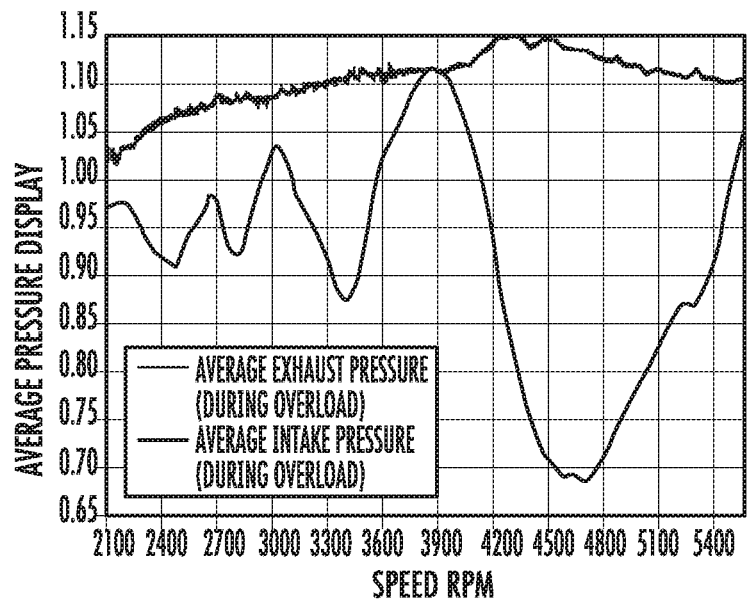
FIG. 11 depicts a plot of example overlap period averaged intake pressure and averaged exhaust manifold pressure for a wide-open throttle RPM sweep according to example embodiments of the present disclosure.

FIG. 11 depicts a plot of example overlap period averaged intake pressure and averaged exhaust manifold pressure for a wide-open throttle RPM sweep. FIG. 11 depicts the average pressures during the valve overlap period illustrating the significant differences with the cycle-averaged values. Typically only cycle-averaged values are available for engine control, such as average intake manifold pressure (MAP). The MAP sensor is generally located away from the intake valve. Therefore, pressure fluctuation differences can be significant between these two locations. In particular, significant differences to averaged pressures are observed during the overlap period, as compared to 720 degree cycle averaged readings (fixed camshaft phasing). For these reasons, pressure fluctuations should be considered and modeled to ensure accurate residual gas mass prediction.

Figure 12:
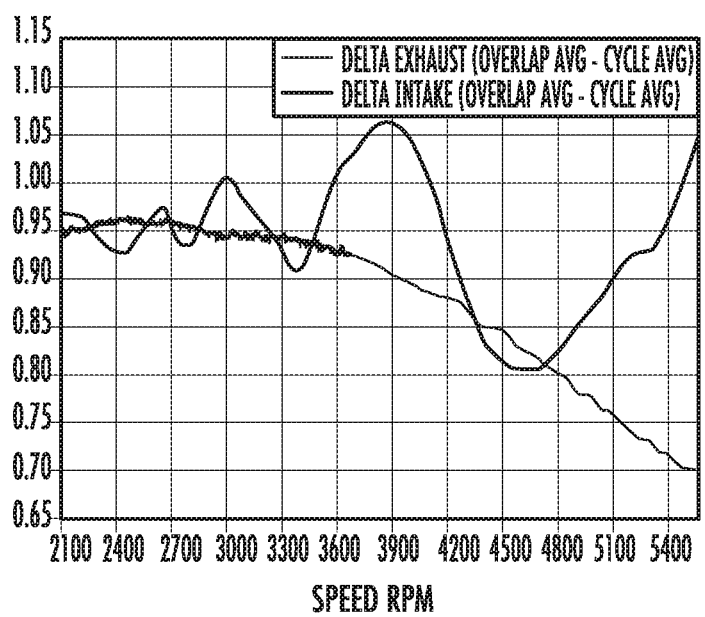

FIG. 12 depicts a plot of example pressure differences between cycle-averaged and valve overlap intake and exhaust manifold pressures for different engine speeds (fixed camshaft phasing). In particular, FIG. 12 depicts the intake and exhaust pressure differences between the overlap and cycle-averaged values at different engine speeds under wide open throttle (WOT) operating conditions. As shown, the magnitude and phase of intake pulsations is significantly influenced by engine speed for the test engine. The trend of phase changes with engine speed indicates different orders of wave reflection occurring as engine speed increases, which is a characteristic of fixed intake runner geometry. The increasing peak-to-peak magnitudes are also consistent with stronger rare-fraction wave generation in-cylinder during the early intake stroke at higher engine speeds. Engine speed effects on pressure differences can be characterized as the reference pressure $\Delta P_{eOL} f(RPM)$ and $\Delta P_{iOL} f(RPM)$. These values are empirically determined to eliminate the calculations that would be required to directly compute these pressure waves from first principles.

Figure 13A:
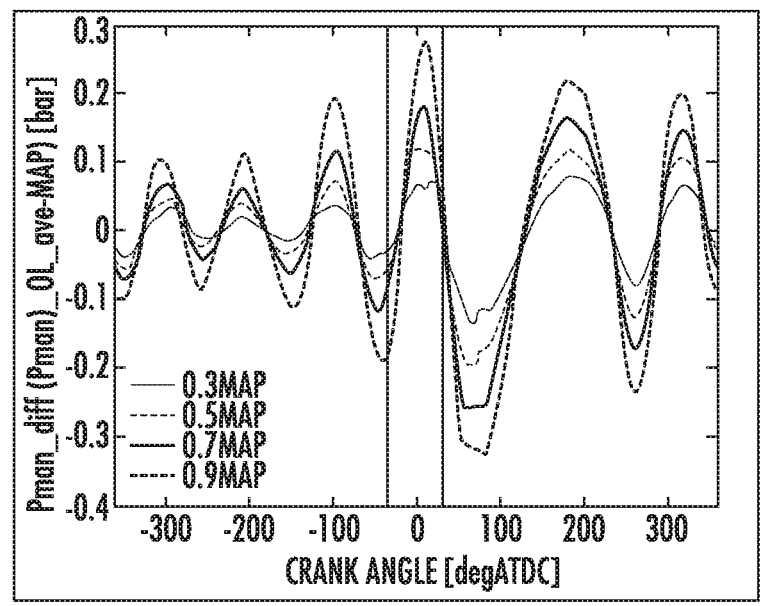
FIG. 13(a) depicts a plot of example normalized intake manifold pressure waves for different engine loads according to example embodiments of the present disclosure.
Figure 13B:
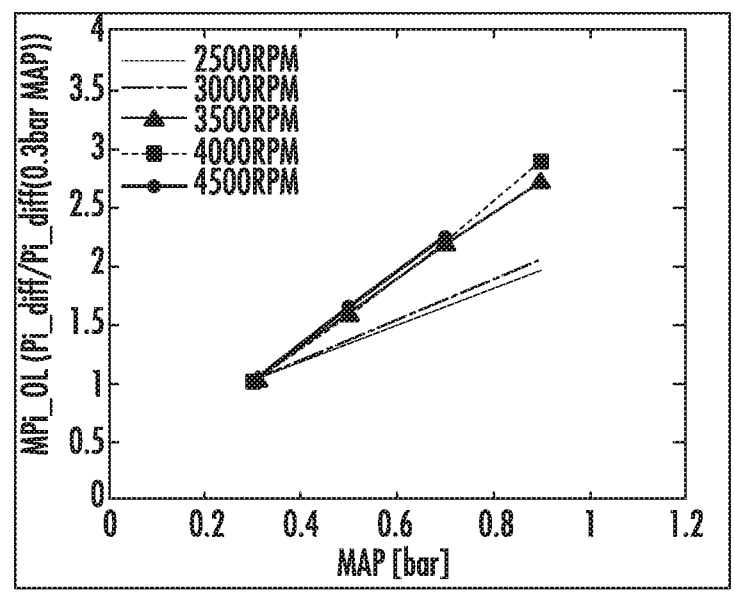
FIG. 13(b) depicts a plot of example intake pressure overlap offset multipliers for different engine operation conditions according to example embodiments of the present disclosure.

Engine intake manifold pressure can be another physical characteristic affecting gas dynamic waves. For instance, FIG. 13(a) depicts a plot of example normalized intake manifold pressure waves for different engine loads at 4000 RPM (fixed camshaft phasing). FIG. 13(b) depicts a plot of example intake pressure overlap offset multipliers for different engine operation conditions. FIGS. 13(a) and 13(b) depict the normalized crank angle resolved intake manifold pressure waves for different engine MAPs at 4000 RPM. As shown, higher engine loads have higher gas dynamic wave magnitudes that can be modeled by a MAP and engine speed related multiplier MPi_OL. The MAP effect on exhaust gas dynamics during overlap is relatively small (<1 Kpa) for the test engine. It is important to note that the magnitude and phase of intake and exhaust pressure waves will ultimately depend upon air-path system layout, firing order, and other parameters (e.g. valve timings, expansion ratio, valve flow areas, etc.) of a particular engine design.

Figure 14:
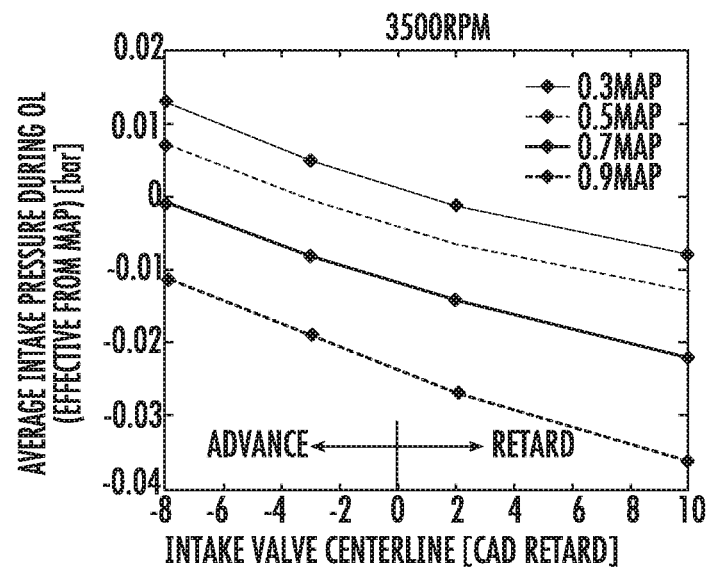
FIG. 14 depicts a plot of example average intake pressures during overlap according to example embodiments of the present disclosure.
Figure 15:
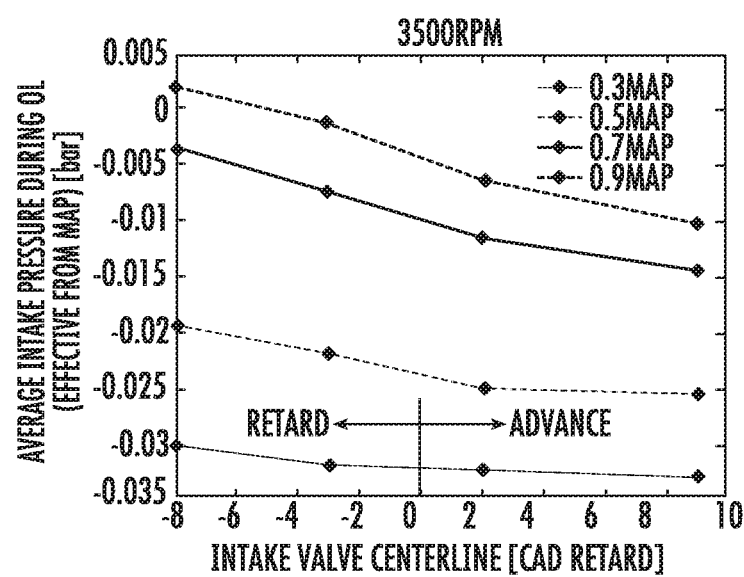
FIG. 15 depicts a plot of example camshaft phasing effects on wave-induced pressure difference during overlap according to example embodiments of the present disclosure.

Camshaft phasings may also affect the intake/exhaust manifold pressure during overlap, as they influence the timing of valve flow areas with respect to piston motion and the exhaust blow-down event. For instance, FIG. 14 depicts a plot of example average intake pressures during overlap. In particular, FIG. 14 depicts the influence of intake camshaft phasing on intake pressure difference during overlap. Camshaft phasing effects are assumed to be linear with slope changing as a function of intake manifold pressure for simplification. FIG. 15 depicts a plot of example camshaft phasing effects on wave-induced pressure difference during overlap. Combining the engine speed, engine load and camshaft phasing effects together, the intake/exhaust gas dynamic models for intake and exhaust can be represented as follows:

$$\Delta Pi_{OL} = M_{Pi_{OL}} f(MAP, RPM) \cdot \Delta Pi_{OL} f(RPM) + \Delta Pi_{OL} f(ICL)$$

$$\Delta Pe_{OL} = \Delta Pe_{OL} f(RPM) + \Delta Pe_{OL} f(ECL)$$

It is important to note that port pressures can vary significantly from cylinder to cylinder, due primarily to intake/exhaust layout and firing order. For this reason, separate overlap pressure correction equations are expected to be utilized for each cylinder in a production application.

Figure 16:
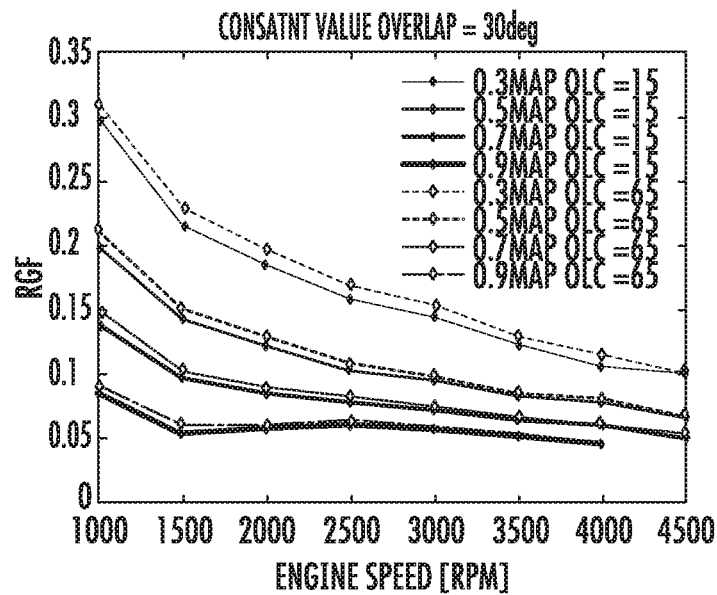
FIG. 16 depicts a plot of example engine speed effects on residual gas fraction for varying engine MAP and OLC according to example embodiments of the present disclosure.

For a given overlap crank angle duration, higher engine speeds produce a shorter time-window for burned gas backflows. This generally translates to lower residual gas mass/fraction values at higher engine speed levels. For instance, FIG. 16 depicts a plot of example engine speed effects on residual gas fraction for varying engine MAP and OLC. According to example aspects, the residual gas fraction can increase as engine speed increases beyond a certain level on some engine designs due to flow restrictions across the exhaust valve and in the exhaust manifold. This type of influence can be modeled by the intake or exhaust pressure terms. As shown, the RGF dips at 1500 RPM and 0.9 bar due to pressure pulsations in the intake and exhaust systems. In general, increased engine speed reduces the time available for residual backflows to occur and reduces residual gas mass.

The trapped residual gas mass in cylinder can be determined by engine clearance volume and burned gas density. The engine clearance volume can be calculated from engine compression ratio and displacement, as follows:

$$V_c = \frac{V_d}{r_c - 1}$$

Burned gas density can be calculated from exhaust pressure and temperature using the ideal gas law, as follows:

$$\rho_{burned} = \frac{P_e}{RT_e}$$

Exhaust pressure is utilized in this case because cylinder pressure sensors are not commonly available in production applications and they can suffer from low accuracy in the exhaust stroke due to thermal shock recovery and drift (depending upon sensor type and mounting location). Exhaust pressure measurements that can be obtained with higher confidence, but this can lead to errors under certain conditions (e.g. when flow rates across the exhaust valve are very high near EVC). The exhaust temperature in this equation is read from an ECU exhaust temperature prediction model which reflects the average exhaust temperature value during one engine cycle.

In example embodiments, the final residual gas mass model may be a combination of backflow and trapped mass contributions. The contribution of trapped residual gas mass, $m_{trapped}$, can be calculated from engine clearance volume and burned gas density, as follows:

$$m_{trapped} = C2 \cdot \rho \cdot V_c.$$

The backflow and trapped residual masses may be combined together resulting in the total residual gas mass prediction:

$$RGM = C1 \cdot \sqrt{(P_e/RT_e) \cdot (P_e - P_i)} \cdot A_{flow} \cdot \frac{OLV}{N} + C2 \cdot \left(\frac{P_e}{RT_e}\right) \cdot V_c$$

Adding intake and exhaust gas dynamic effects ($\Delta Pi_{OL}$ and $\Delta Pe_{OL}$) to the model, the RGM model can be shown as:

$$RGM = C_1 \cdot \sqrt{((P_e/RT_e) \cdot ((P_e + \Delta Pe_{OL}) - (P_i + \Delta Pi_{OL}))} \cdot A_{flow} \cdot \frac{OLV}{N} + C_2 \cdot \left(\frac{P_e}{RT_e}\right) \cdot V_c$$

Figure 17:
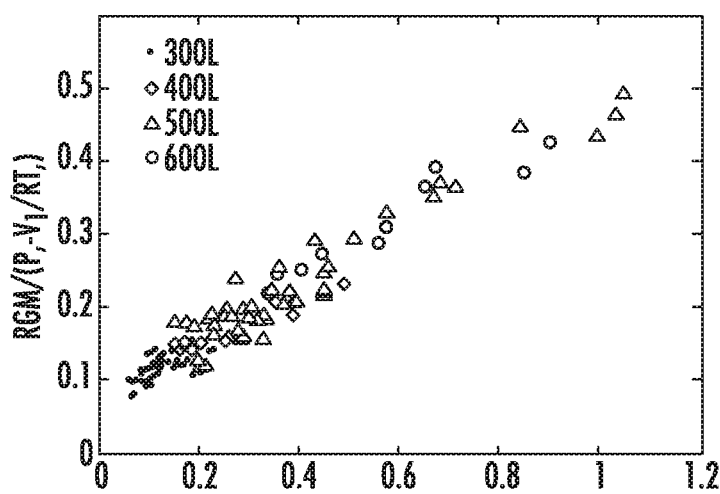
FIG. 17 depicts a plot of example linear polynomial fitting results for constants C1 and C2 in the RGM model according to example embodiments of the present disclosure.

In this equation, C1 and C2 are unknown parameters. They can be obtained by applying a linear fit to the experimental data based AVL GCA calculation results. For instance, FIG. 17 depicts a plot of example linear polynomial fitting results for constants C1 and C2 in the RGM model. The RGM prediction model utilizes both physical inputs and calibration constants. Physical parameters are measured from production engine sensors (e.g. manifold pressure, engine speed, etc.) or calculated from measured engine geometry (e.g. valve flow area). Besides physical inputs, there are eight constants (two in the RGM model C1, C2 and six in the gas dynamic models) that require calibration based on experimental data.

The experimental data sets used for GCA calculation shown in FIG. 17 cover engine speeds from 1000 RPM to 4500 RPM, MAP from 0.3 bar to 0.9 bar, and valve overlap from 30 deg to 60 deg. The linear polynomial fitting results are shown in Table 1.

TABLE 1

Linear Polynomial Fitting for RGM Model

| | |
|---|---|
| Constant $C_1$ | 0.4225 |
| Constant $C_2$ | 0.0651 |
| $R^2$ | 0.8927 |
| Root-Mean-Square-Error | 0.0325 |

Figure 18:
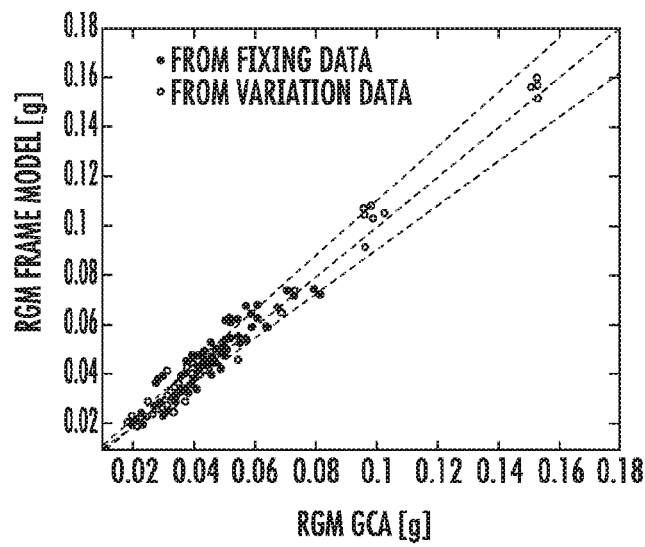
FIG. 18 depicts a plot of example off-line RGM model validation according to example embodiments of the present disclosure.
Figure 19:
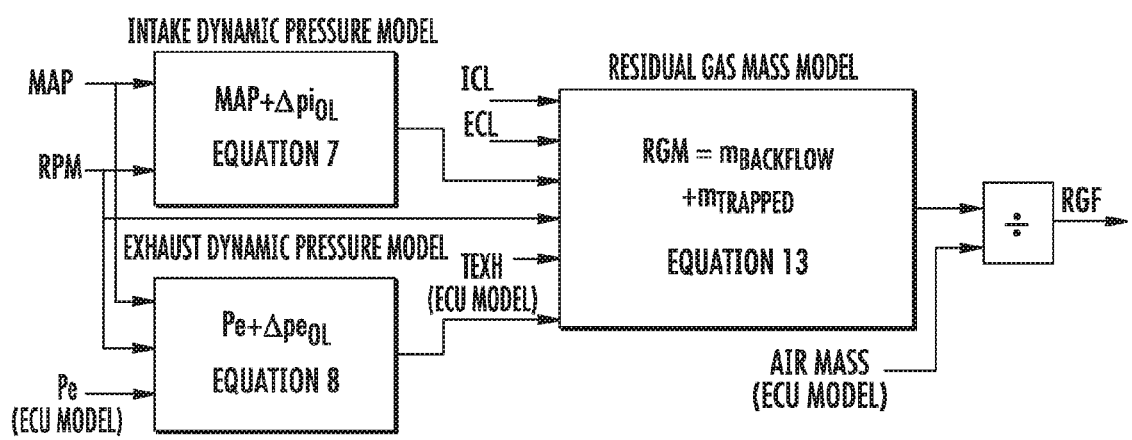
FIG. 19 depicts a block diagram of an example residual gas fraction prediction model according to example embodiments of the present disclosure.

FIG. 18 depicts a plot of example off-line RGM model validation. In particular, FIG. 18 depicts comparison between the model prediction using test data for inputs and the reference values calculated using AVL GCA. As shown, the blue dots correspond to the fitting/training data and the red dots correspond to the validation data. In particular, the off-line validation results include a root mean square error (RMSE) of 0.0072 g, and a maximum error of 0.0110 g. The residual gas mass prediction model can be implemented using various suitable simulation tools. For instance, the RGM model can be implemented using Simulink. FIG. 19 depicts a block diagram of a residual gas fraction prediction model. The blue subsystem is the dynamic intake pressure prediction model and red subsystem is the dynamic exhaust pressure prediction model. The white subsystem is the residual gas mass prediction model. Residual gas mass can be calculated from the RGM model and the total inducted mass is obtained from other algorithms in the engine controller. Combining residual gas and inducted charge mass together, the residual gas fraction (RGF) can be calculated. The Simulink model can be implemented using various interface modules, such as an ETAS ES910 rapid prototype ECU, for real-time validation on the engine. The Simulink model can also be auto-coded using Real Time Workshop and input into ETAS INTECRIO. The model can subsequently be compiled into real-time code to run on the ES910. The model variables along with appropriate engine controller variables can then be observed and captured using ETAS *INCA*.

Figure 20A:
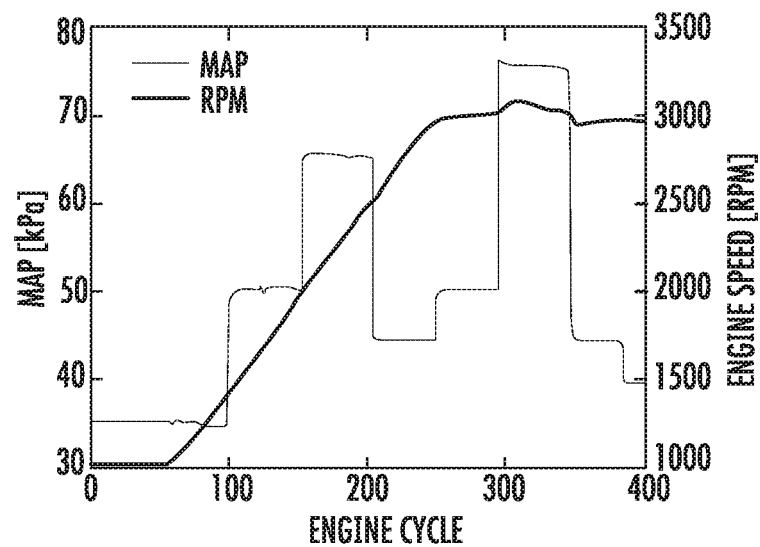
FIG. 20(a) depicts a plot of engine operating conditions (manifold pressure and engine speed) according to example embodiments of the present disclosure.
Figure 20B:
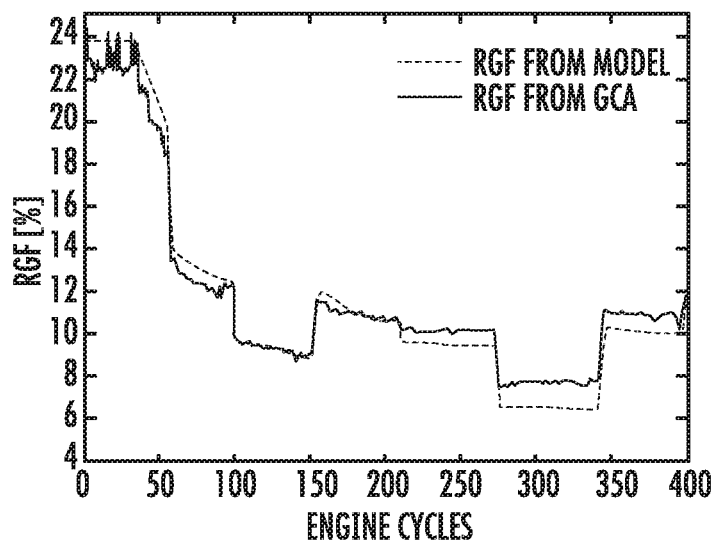
FIG. 20(b) depicts a plot of an example comparison between RGF from GCA (reference, off-line calculation), and the real-time RGF from the model according to example embodiments of the present disclosure.

FIG. 20 depicts plots of example real time residual gas fraction prediction validation results (1000 RPM-3000 RPM, fixed camshaft position). In particular, FIG. 20(*a*) depicts the engine operating conditions (manifold pressure and engine speed). FIG. 20(*b*) depicts a comparison between RGF from GCA (reference, off-line calculation), and the real-time RGF from the model. During this transient condition, the RGF model accurately predicts the reference values (calculated off-line with GCA) with a 0.84% RGF RMSE and a maximum of 1.9% RGF error (with worst case relative estimation error of 24%).

Figure 21A:
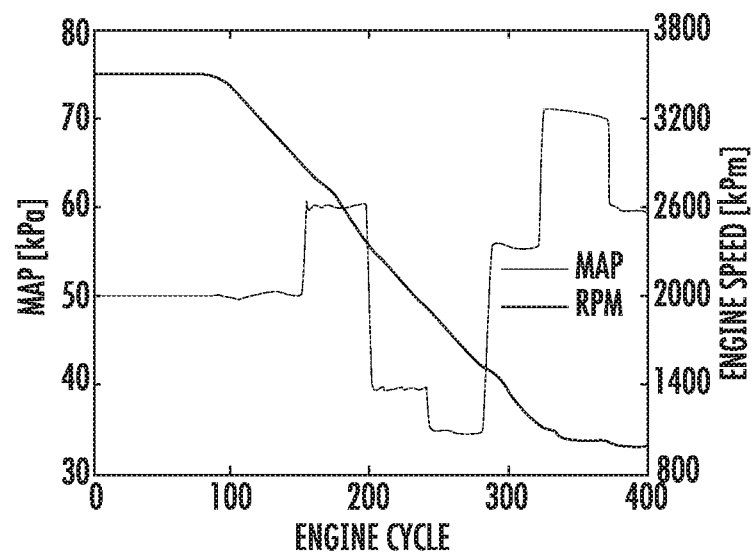
FIG. 21(a) depicts a plot of example engine operating conditions where engine speed was decreased from 3500 RPM to 1000 RPM at varying manifold pressures according to example embodiments of the present disclosure.
Figure 21B:
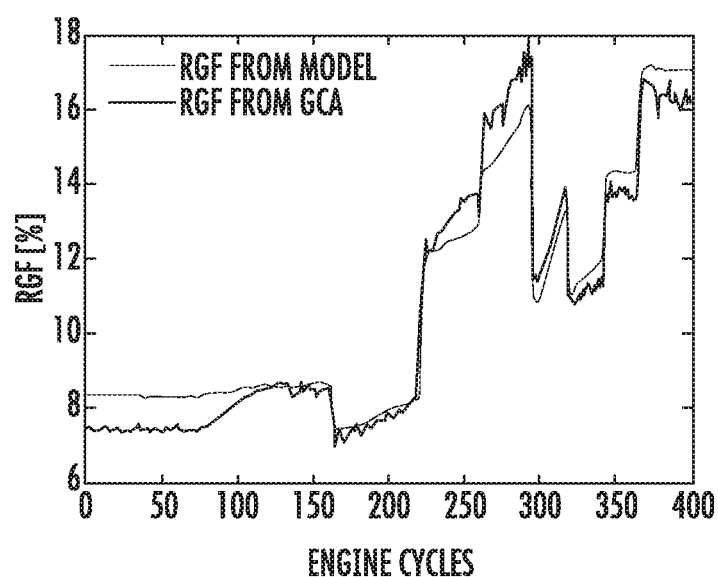
FIG. 21(b) depicts a plot of an example comparison between RGF from GCA (reference, off-line calculation), and the real-time RGF from the model according to example embodiments of the present disclosure.

FIG. 21 depicts plots of example real time residual gas fraction prediction validation results (3500 RPM-1000 RPM, fixed camshaft position). FIG. 21(*a*) shows example engine operating conditions where engine speed was decreased from 3500 RPM to 1000 RPM at varying manifold pressures. FIG. 21(*b*) depicts an example comparison between RGF from GCA (reference, off-line calculation), and the real-time RGF from the model. The RGF comparison results show good real time residual gas fraction predictions with a RMSE of 0.71% RGF and a maximum error of 2.0% RGF (worst case relative estimation error of 13.5%).

Figure 22A:
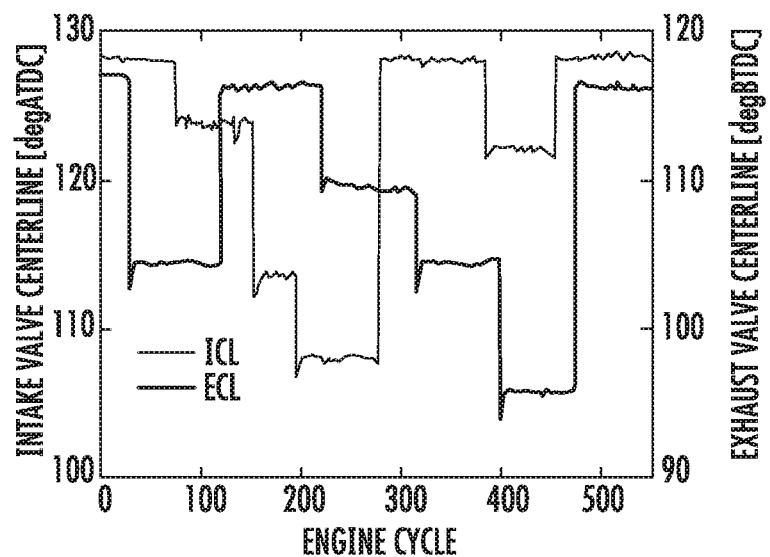
FIG. 22(a) depicts a plot of example valve phaser positions while the engine speed and intake manifold pressure are held constant according to example embodiments of the present disclosure.
Figure 22B:
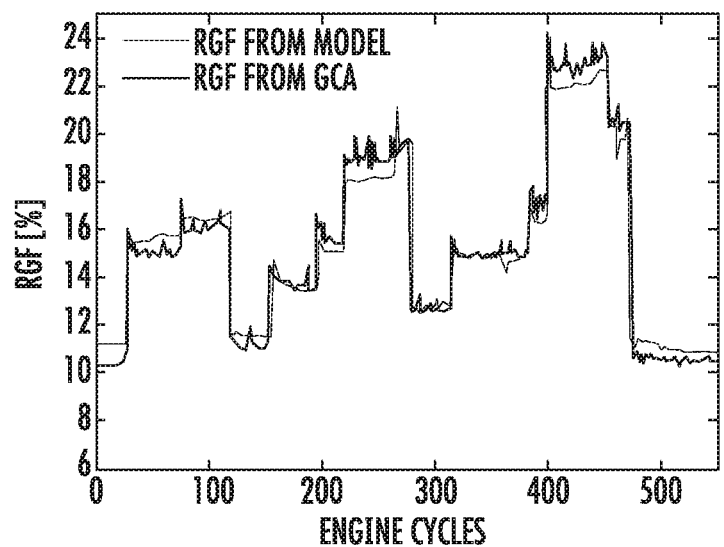
FIG. 22(b) depicts a plot of example RGF model predictions of residual gas mass/fraction for different camshaft phasings under transient engine operation according to example embodiments of the present disclosure.

FIG. 22 depicts plots of example real time residual gas fraction prediction validation results for transient intake and exhaust camshaft phasings (engine speed being 2000 RPM and MAP being 50 kPa). FIG. 22 depicts engine operating conditions with transient intake and exhaust camshaft phasings. FIG. 22(*a*) depicts example valve phaser positions while the engine speed and intake manifold pressure are held constant. FIG. 22(*b*) depicts example RGF model predictions of residual gas mass/fraction for different camshaft phasings under transient engine operation. The RMSE for 550 transient engine cycles is 0.83% RGF with a maximum error of 2.3% RGF (worst case relative estimation error of 9.8%). The results are further shown in Table 2.

TABLE 2

RGF model validation results for transient engine operation

| Transient engine operations | Root Mean Square Error | Maximum Error |
|---|---|---|
| RPM and MAP transient (1000-3000 rpm) | 0.84 RGF% | 1.9 RGF% |
| RPM and MAP transient (3500-1000 rpm) | 0.71 RGF% | 2.0 RGF% |
| Intake and Exhaust valve timing transient | 0.83 RGF% | 2.3 RGF% |

Figure 23:
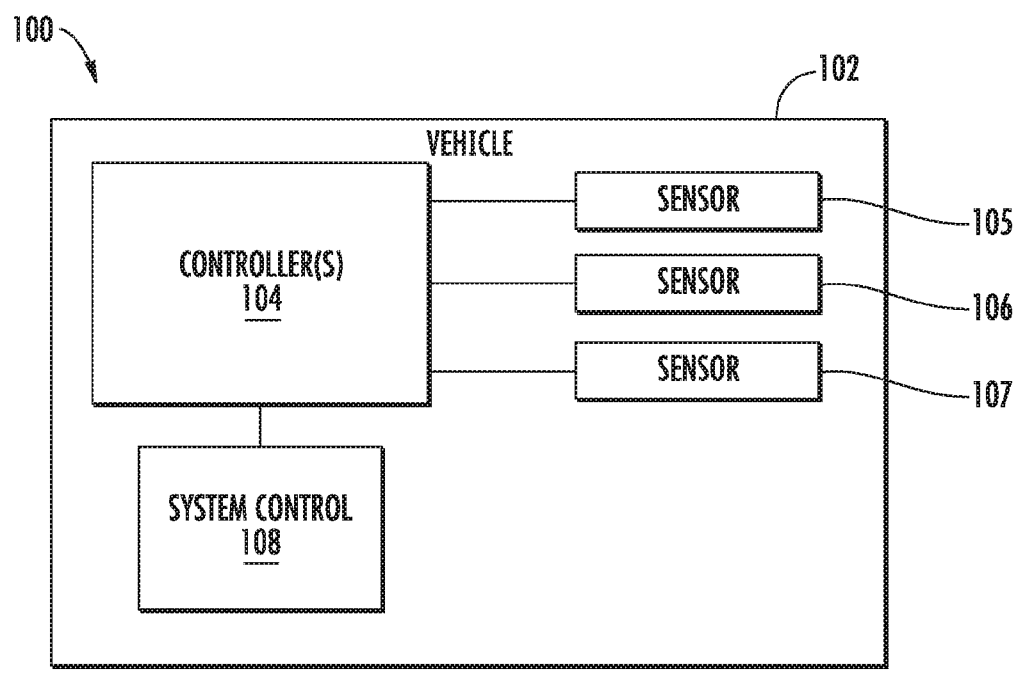
FIG. 23 depicts an example system according to example embodiments of the present disclosure.

As indicated above, one or more control devices can be configured to implement the RGM prediction method to control one or more aspects of operation of a vehicle engine. For instance, FIG. 23 depicts an example system 100 for controlling the operation of a vehicle engine. System 100 can include a vehicle 102, one or more controllers 104, one or more sensors 105, 106, and 107, and one or more system control elements 108. In particular, system 100 can be used to control one or more aspects of the operation of an engine of vehicle 102. For instance, system 100 can be configured to control the engine operation of vehicle 102 based at least in part on the RGF model described herein.

Controller(s) 104 can include any number of control devices. In one implementation, for example, controller 104 can include one or more processor(s) and associated memory device(s) configured to perform a variety of computer-implemented functions and/or instructions (e.g. performing the methods, steps, calculations and the like and storing relevant data as disclosed herein). The instructions when executed by the processor can cause the processor to perform operations, including providing control commands to various aspects of system 100. Additionally, controller 104 may also include a communications engine to facilitate communications between the system control 108 and the various components of the system 100. Further, the communications engine may include a sensor interface (e.g., one or more analog-to-digital converters) to permit signals transmitted from one or more sensors to be converted into signals that can be understood and processed by the controller(s) 104. It should be appreciated that the sensors (e.g. sensors 105-107) may be communicatively coupled to the communications module using any suitable means. For example, the sensors 105-107 may be coupled to the sensor interface via a wired connection. However, in other embodiments, the sensors 105-107 may be coupled to the sensor interface via a wireless connection, such as by using any suitable wireless communications protocol known in the art. As such, the processor may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure controller 104 to perform the various functions as described herein.

As indicated above, sensors 105-107 may comprise one or more sensors configured to detect various signals such as manifold pressure, engine speed, etc. Such detected signals may be provided to controller(s) 104. Controller(s) 104 may use such signals in the implementation of the RGF model according to example embodiments of the present disclosure. Controller(s) 104 may then provide one or more control commands to system control 108, such that system control 108 may control various aspects of engine operation of vehicle 102. In example embodiments, the one or more control commands may be derived at least in part from the determined RGF model.

Example embodiments of the present disclosure provide a semi-physical residual gas mass prediction model. Various factors, such as intake and exhaust pressures, may be modeled with consideration of tuning wave effects. A semi-physical method can be used to capture the dynamic waves in the intake and exhaust pressures during the valve overlap period. The residual gas mass prediction can be based on Bernoulli's principle and may consider camshaft phasing, engine geometry, and piston motion effects. The residual gas mass calculation model can be implemented as real-time code in a rapid prototype engine controller for experimental validation.

Validation of the residual gas mass model can be carried out by both off-line and on-engine real-time methods. The reference residual gas mass/fraction data sets can be generated using a high-fidelity off-line flow simulation based on experimental data. For the off-line validation, separate steady-state data sets can be used to fit empirical constants and to validate model accuracy. The proposed model can predict residual gas mass to within about 10% error from the intended value for 94% of the validation points. As used herein, the term "about," when used in conjunction with a numerical value, refers to within 30% of the numerical value. Real-time validation can be realized by comparing real-time model predictions with values from the off-line reference simulation under the same transient engine operating conditions with favorable results. The proposed model may demonstrate an RMSE for separate speed, load, and camshaft phasing transients to within 1.0% RGF with maximum errors in the range of 1.9-2.3% RGF, producing a maximum relative estimation errors in the range of 10-24%.

Example embodiments of the present disclosure can be implemented using various vehicle engines. For instance, a naturally-aspirated 3.6 L V-6 port fuel injected engine can be used. In further embodiments, engines can be used in which camshaft phasers shift a fixed valve lift profile relative to the crank shaft (i.e. the valves have a fixed duration and lift). Further engines can be used having a pent-roof shaped combustion chamber contains two intake and two exhaust valves per cylinder. A production intent engine controller modified to incorporate an ETAS INTECRIO rapid-prototype control system can be used to vary engine actuators and test control models. The system can allow for integration of control models, programmed using MATLAB/Simulink, in concert with a production controller.

Further, a 430 kW AC engine dynamometer can be used, wherein the test cell contains an experiment management system for precise data acquisition and control of test objects. Crank angle resolved data acquisition can be performed using an AVL-671 32-channel system. Cylinder pressures can be measured using AVL GH12D piezoelectric sensors. Piezoresistive Kulite sensors can be used for dynamic pressure measurements in both the intake and exhaust ports of the test engine. The data can be sampled in 0.5 crank angle degree intervals to properly capture all relevant gas exchange characteristics. It will be appreciated by those skilled in the art that various other suitable engines and/or components can be used without deviating from the scope of the present disclosure.

Various tools, such as AVL's Gas Exchange and Combustion Analysis (GCA) software, can be used to generate numerous gas exchange and engine combustion parameters which are unavailable or very difficult to obtain from standard sensor measurements. GCA uses a combination of engine geometry and experimental data, such as intake and exhaust manifold pressures, to set up boundary conditions for a gas dynamic model. Then an experimentally measured in-cylinder pressure curve is applied to determine the heat release rate and other combustion characteristics. The simulation results from GCA can be validated by comparing with experimentally obtained cylinder pressure curves, indicated effective pressures, energy balances, and mass burn fraction curves. The reference residual gas mass data sets can be generated from GCA. Residual gas mass is calculated based on the cross-valve mass flow rate model, using experimentally measured intake, exhaust pressures, cylinder pressure, intake and exhaust system geometries, as follows:

$$\dot{m} = A_{Ref} \cdot C_d \cdot p_{O1} \cdot \sqrt{\frac{2}{R_{O1} \cdot T_{O1}}} \cdot \sqrt{\frac{k}{k-1} \cdot \left[ \left( \frac{p_2}{p_{O1}} \right)^{\frac{2}{k}} - \left( \frac{p_2}{p_{O1}} \right)^{\frac{k+1}{k}} \right]}$$

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of a controlling spark timing associated with a combustion engine, the method comprising:
   receiving, by one or more computing devices from an upper level controller associated with the combustion engine, a combustion phasing target to be implemented by the combustion engine;
   determining, by the one or more computing devices, a spark timing associated with the combustion engine based at least in part on the combustion phasing target, and in part on a combustion phasing prediction model determined based at least in part on residual gas fraction associated with the combustion engine;

wherein the residual gas fraction is determined based at least in part on residual gas mass determined based at least in part on one of exhaust and intake gas flow and pressure.

2. The computer-implemented method of claim 1, wherein the combustion phasing target is a CA50 target.

3. The computer-implemented method of claim 1, wherein determining, by the one or more computing devices, a spark timing associated with the combustion engine comprises determining the spark timing to substantially achieve the combustion phasing target.

4. The computer-implemented method of claim 3, wherein determining, by the one or more computing devices, a spark timing associated with the combustion engine comprises determining the spark timing subject to one or more constraints.

5. The computer-implemented method of claim 4, wherein the one or more constraints comprise at least one of engine knock or excessive coefficient of variance of indicated mean effective pressure.

6. The computer-implemented method of claim 1, further comprising adjusting, by the one or more computing devices, the spark timing based at least in part on one or more feedback signals associated with the combustion engine.

7. The computer-implemented method of claim 1, wherein combustion phasing prediction model comprises a combustion model.

8. The computer-implemented method of claim 7, further comprising adapting the combustion model based at least in part on one or more of laminar flame speed or turbulence intensity.

9. The computer-implemented method of claim 7, wherein the combustion model requires one or more of laminar flame speed, turbulence intensity, cylinder pressure or flame kernel development as inputs.

10. The computer-implemented method of claim 9, wherein the one or more of laminar flame speed, turbulence intensity, cylinder pressure or flame kernel development are determined using input models associated with the combustion engine.

11. The computer-implemented method of claim 1, wherein the residual gas mass is determined based at least in part on exhaust gas backflow into one or more cylinders associated with the combustion engine and trapped residual gas at one or more exhaust valves associated with the combustion engine.

12. The computer-implemented method of claim 11, wherein the residual gas mass is determined based at least in part on exhaust and intake pressure differences caused by wave tuning dynamics.

13. A computing system associated with an automobile, the computing system comprising:

one or more processors; and one or more memory devices, the one or more memory devices storing computer-readable instructions that when executed by the one or more processors cause the one or more processors to perform operations, the operations comprising:

receiving a combustion phasing target from an upper level controller to be implemented by a combustion engine associated with the automobile;

determining a spark timing associated with the combustion engine based at least in part on the combustion phasing target, and in part on a combustion phasing prediction model determined based at least in part on residual gas fraction associated with the combustion engine;

wherein the residual gas fraction is determined based at least in part on residual gas mass determined based at least in part on one of exhaust and intake gas flow and pressure.

14. The computing system of claim 13, wherein determining a spark timing associated with the combustion engine comprises determining the spark timing subject to one or more of engine knock or excessive coefficient of variance of indicated mean effective pressure.

15. The computing system of claim 13, the operations further comprising adjusting the spark timing based at least in part on one or more feedback signals associated with the combustion engine.

16. An automobile comprising:

one or more control systems configured to perform operations, the operations comprising:

receiving a combustion phasing target from an upper level controller to be implemented by a combustion engine associated with the automobile;

determining a spark timing associated with the combustion engine based at least in part on the combustion phasing target, and in part on a combustion phasing prediction model determined based at least in part on residual gas fraction associated with the combustion engine;

wherein the residual gas fraction is determined based at least in part on residual gas mass determined based at least in part on one of exhaust and intake gas flow and pressure.

17. The automobile of claim 16, wherein determining the spark timing uses at least one of a polynomial fitting technique, constraint relaxation technique, or a direct search technique.

\* \* \* \* \*